United States Patent
Hanmura et al.

(10) Patent No.: US 6,719,833 B2
(45) Date of Patent: Apr. 13, 2004

(54) RECORDING MEDIUM, AND IMAGE FORMING METHOD AND RECORDED MATTER USING SAME

(75) Inventors: Masahiro Hanmura, Nagano (JP); Hiroyuki Onishi, Nagano (JP); Hiroko Hayashi, Nagano (JP); Miharu Kanaya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/769,022

(22) Filed: Jan. 25, 2001

(65) Prior Publication Data

US 2001/0021440 A1 Sep. 13, 2001

(30) Foreign Application Priority Data

Jan. 26, 2000 (JP) ....................... 2000-016688

(51) Int. Cl.[7] ....................... C09D 11/02; C07D 401/12; C07D 221/18; C09B 5/14
(52) U.S. Cl. ....................... 106/31.47; 347/100; 283/45; 544/188; 546/76
(58) Field of Search ....................... 106/31.47; 347/100; 283/45; 544/188; 546/76

(56) References Cited

U.S. PATENT DOCUMENTS

| | | | |
|---|---|---|---|
| 5,709,976 A | | 1/1998 | Malhotra ................ 430/124 |
| 5,885,678 A | | 3/1999 | Malhotra ................ 428/41.8 |
| 5,908,723 A | | 6/1999 | Malhotra et al. ......... 430/31 |
| 6,056,812 A | * | 5/2000 | Lin et al. ............... 106/31.47 |
| 6,152,969 A | * | 11/2000 | Matsumoto et al. ....... 546/76 |

FOREIGN PATENT DOCUMENTS

| | | |
|---|---|---|
| EP | 0431184 | 6/1991 |
| EP | 0530963 | 3/1993 |
| EP | 0761469 | 3/1997 |
| EP | 0876925 | 11/1998 |
| JP | 61146591 | 7/1986 |
| JP | 61277484 | 12/1986 |
| JP | 313376 | 1/1991 |
| JP | 03013376 | 1/1991 |
| JP | 07314882 | 12/1995 |
| JP | 09216917 | 8/1997 |
| JP | 11170686 | 6/1999 |
| JP | 11245504 | 9/1999 |
| JP | 200062310 | 2/2000 |
| JP | 2000141870 | 5/2000 |
| JP | 2000238421 | 9/2000 |
| WO | 9849604 | 11/1998 |
| WO | 9903685 | 1/1999 |
| WO | 9948981 | 9/1999 |
| WO | WO 00/23440 | * 4/2000 |

OTHER PUBLICATIONS

Derwent abstract of JP11/170686, Jun. 1999.*
Derwent abstract of JP2000/238421, Sep. 2000.*
English translation of JP11/170686, including claims, Jun. 1999.*
English translation of JP2000/238421, including claims, Sep. 2000.*
Partial English Translation of Title and Abstract of WO 99/48981 Dated Sep. 30, 1999.
Patent Abstracts of Japan Publication No. 61146591 dated Jul. 4, 1986.
Patent Abstracts of Japan Publication No. 03013376 dated Jan. 22, 1991.
Patent Abstracts of Japan Publication No. 07314882 dated Dec. 5, 1995.
Patent Abstracts of Japan Publication No. 09216917 dated Aug. 19, 1997.
English abstract of WO00/23440 from Patent abstract of Japan (corresponding to JP2000–191660), 4/00.*
English translation of JP2000–191660, claims only, Jul. 2000.*
English abstract of WO99/48981 from Patent abstracts of Japan (corresponding to JP2000–109464), 9/99.*
English translation of JP2000–109464 including claims, Apr. 2000.*

* cited by examiner

Primary Examiner—Helene Klemanski
(74) Attorney, Agent, or Firm—Ladas & Parry

(57) ABSTRACT

A recording medium is provided that exhibits both outstanding ink absorbency and outstanding light resistance of images, and an image forming method and a recorded matter using such recording medium are also provided. The recording medium in the present invention comprises a supporting body and an ink receiving layer deployed on that supporting body, and tho ink receiving layer contains a compound expressed by the general formula (I) below, and having a solubility in water of 0.01 to 5%.

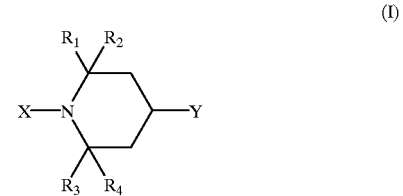

(I)

(where X is H, or an alkyl, aryl or other group; $R_1$ to $R_4$ is H or alkyl group; and Y is OH, or a carboxyl, alkyl, amino, alkenyl, alkoxy, aryl or other group. Y may also be a polymer. This compound may also be a polymer having X and Y as a main chain.)

10 Claims, No Drawings

RECORDING MEDIUM, AND IMAGE FORMING METHOD AND RECORDED MATTER USING SAME

BACKGROUND OF THE INVENTION

1. Field of the Invention

This invention relates to a recording medium exhibiting both outstanding ink absorbency and outstanding image light resistance, and to an image forming method and a recorded matter in which that recording medium is used.

2. Description of the Related Art

Conventionally, using recording liquids containing dyes or other colorants, recording media exhibiting outstanding recording liquid absorbency and recording media for forming image exhibiting outstanding light resistance have been developed.

An example of such a recording medium is disclosed ad in Japanese Patent Application Laid-Open No. S61-146591/1986, for example, which in an ink jet recording medium for forming recorded images using a water-soluble ink containing a water-soluble dye, and which contains a hindered amine compound, with the object of providing a recording medium that exhibits improved resistance to discoloration and light resistance, particularly for water-soluble black dyes and/or water-soluble magenta dyes.

Also, in Japanese Patent Application Laid-Open No. H3-13376/1991, a recording material having a layer wherein a pigment is the main component in the surface layer of a base material, containing in that layer a hindered phenol compound and a hindered amine compound in a specific weight ratio, and an ink jet recording method performed by deploying droplets of a recording liquid containing a water-soluble dye to that recording material are disclosed, with the object of providing a recording material that exhibits outstanding ink absorbency and dye color producing properties, wherewith high-quality and high-resolution images can be obtained, and of providing a recording material that gives recorded images exhibiting good recorded image preserving properties and little deterioration, particularly deterioration caused by room discoloration, together with a recording method for forming such images.

In Japanese Patent Application Laid-Open Nu. E7-314882/1995, furthermore, a sheet is disclosed that has a porous ink receiving layer containing a hindered amine compound on a base material, with the object of obtaining recording sheets exhibiting good ink absorbency, good color fixation, and little fading even when stored for an extended period after printing The Japanese Patent Application Laid-Open No. H9-216917/1997, moreover, an ink jet recording paper is disclosed wherewith a coating liquid containing a copolymer or polymer formed using a specific hindered amino compound is coated on or impregnated in the recording paper, with the object of providing a suitable material for use as an additive to coating liquids for ink jet recording paper.

However, with the recording media containing hindered amine compounds and the recording methods described in these publications, satisfactory ink absorbency and image light resistance arc still not obtained. In these publications, furthermore, while there is description Or having hindered amine compounds contained in the recording media, there is no description either of the solubility in water of hindered amine compounds or of the effectiveness of using certain dyes in recording liquids.

In particular, with a recording medium containing a hindered amine compound that is highly soluble in water, during image recording using a recording liquid, that hindered amine compound is dissolved by the water contained in the recording liquid and penetrates into the interior of the recording medium. For that reason, that hindered amine compound cannot be made to be present in the vicinity of dyes or other colorants in the images obtained, and effectiveness in improving light resistance is not demonstrated when that hindered amine compound is used. With a recording medium containing a hindered amine compound that exhibits very low solubility in water, and that hardly dissolves at all in water, on the other hand, although effectiveness in improving light resistance is demonstrated, the ink absorbency of the ink receiving layer during the recording of images using the recording liquid deteriorates, and satisfactory images are not obtained.

SUMMARY OF THE INVENTION

That being so, an object of the present invention is to provide a recording medium exhibiting both outstanding ink absorbency and outstanding light resistance of images, and an image forming method and a recorded matter using that recording medium.

As a result of extensive and assiduous research, the inventors arrived at the present invention after discovering that, by using a hindered amine compound having a specific solubility in water, that hindered amine compound can be made to be present in the vicinity of dye in an image recorded without lowering ink absorbency, so that the object noted above can be attained, even in cases where that hindered amine compound is used in small quantities.

More specifically, the present invention provides a recording medium comprising a supporting body and an ink receiving layer deployed on that supporting body, wherein the ink receiving layer contains a compound expressed by the general formula (I) indicated below and exhibiting a solubility in water of 0.01 to 5%.

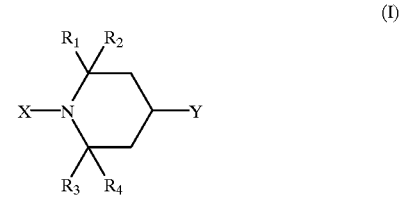

(I)

(where X represents a hydrogen atom, or an alkyl, aryl group, alkenyl, acyl, sulfonyl, sulfinyl, alkoxy, or acyloxy group, which may or may not have a substituent; $R_1$ to $R_4$ represents respectively and independently a hydrogen atom or an alkyl group; and Y represents a hydroxyl, carboxyl, alkyl, amino, alkenyl, alkoxy, aryl, alkyl carbonyloxy, alkenylcarbonyloxy, arylcarbonyloxy, aminocarbonyloxy, alkoxyalkyl, aralkyl, alkylcarbonyloxy, alkylsulfonylamino, alkylaminocarbonyl, aralkyloxycarbo, alkoxycarbonyl group, or alkylaminosulfonyl group, which groups may or may not have a substituent. Also, it is possible for Y to be a polymer, and the compound expressed by formula (I) can be a polymer having X and Y are main chains.)

The present invention also provides an image forming method for forming images on the recording medium noted above using a recording liquid containing a compound represented by the general formula (II) given below.

(II)

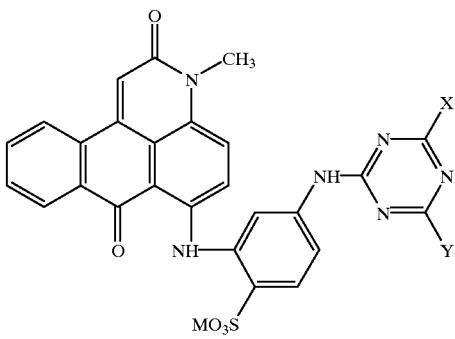

where X is an anilino group substituted for with at least one SO₃M, Y is OH, Cl, or a morpholino group, and M is H, Li, Na, K, ammonium or an organic amine.

The present invention also provides a recorded matter in which an image is formed using a recording liquid containing a compound represented by the general formula (II) given below.

(II)

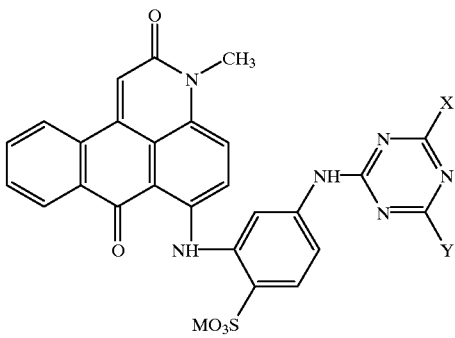

where X is an anilino group substituded with at least one SO₃M, Y is OH, Cl, or a morpholino group, and M is H, Li, Na, K, ammonium , or an organic amine.

DESCRIPTION OF THE PREFERRED EMBODIMENTS

A detailed description is now given of the recording medium of the present invention.

The recording medium of the present invention Comprises a supporting body and an ink receiving layer deployed on that supporting body In that ink receiving layer is contained a hindered amine compound that is expressed by the general formula (I) given below, and which exhibits a solubility in water of 0.01 to 5% (hereinafter called "specific solubility hindered amine compound"). When "solubility" is simply mentioned in this specification, the solubility in water is intended.

(I)

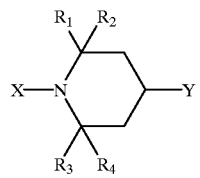

(wherein: X represents a hydrogen atom, or an alkyl, aryl, alkenyl, acyl, sulfonyl, sulfonyl, alkoxy or acyloxy group, which may or may not have a substituent; $R_1$ to $R_4$ represents respectively and independently a hydrogen atom or an alkyl group; and Y represents a hydroxyl, carboxyl, alkyl, amino, alkenyl, alkoxy, aryl, alkylcarbonyloxy, alkenylcarbonyloxy, arylcarbonyloxy, aminocarbonyloxy, alkoxyalkyl, aralkyl, alkylaminocarbonyl, alkylsulfonylamino, alkylaminocarbonyl, aralkyloxycarbonyl, alkoxycarbonyl, or alkylaminosulfonyl group, which may or may not have a substituent. Also, it is possible for Y to be a polymer, and the compound expressed by formula (I) can be a polymer having X and Y as main chains.)

By causing this specific solubility hindered amine compound to be contained in the ink receiving layer, it can be suppressed that the hindered amine compound is dissolved by the water contained in the recording liquid while an image is being recorded using the recording liquid and the hindered amine compound remains in the ink receiving layer whore the image is formed, and thus can be prevented from penetrating into the interior of the recording medium. For that reason, that hindered amine compound can be made to be present in the vicinity of the dye that servos ac a colorant in the image recorded with the recording liquid and, as a result, an image exhibiting outstanding light resistance can be formed. In particular, this effect can be manifested even when only a small quantity of that hindered amine compound is used.

The specific solubility hindered amine compound used in the present invention has a solubility of 0.01 to 5%, as noted earlier. Now, if the solubility exceeds 5%, when the recording liquid is applied in the recording medium, the hindered amino-compound dissolves in the water in the recording liquid, and permeates from the ink receiving layer Lo the interior of the supporting body in the recording medium. At this Lime, furthermore, the dye in the recording liquid effects ion bonding with the cationic polymer(s) ordinarily used and is bound so that it is present in the vicinity of the surface of the recording medium. For that reason, the hindered amine compound ceases to be present in the vicinity of the dye, and, the effects of enhancing the light resistance of images are not exhibited. When the solubility is below 0.01%, conversely, although effectiveness in enhancing light resistance of images is exhibited, ink absorbency declines, and good images are not obtained.

The solubility of the specific solubility hindered amine compound described shove should preferably be from 0.1 to 5%, and more preferably from 0.1 to 3%, in the interest of enhancing ink absorbency and facilitating the formation of images that exhibit even more outstanding light resistance.

The specific solubility hindered amine compound, as noted earlier, is a compound having the structure expressed by the general formula (I) given earlier, wherein X represents a hydrogen atom, or alkyl, aryl, alkenyl, acyl, sulfonyl, sulfinyl, alkoxy or acyloxy group, which may or may not have a substituent. Of these, it is preferable that X be a hydrogen atom, an alkyl group (especially having 1 to 8 carbons), an alkoxy group (especially having 1 to 8 carbons), and an alkyl group having a substituent (such as a carboxyalkylcarbonyloxy group, for example).

In the general formula (I), $R_1$ to $R_4$ represents respectively independent a hydrogen atom or an alkyl group, but preferably an alkyl group having 1 to 3 carbons, and more preferably a methyl group. It is particularly to be preferred that $R_1$ to $R_4$ all be methyl groups.

In the general formula (I), furthermore, Y represents a hydroxyl, carboxyl, alkyl, amino, alkenyl, alkoxy, aryl, alkylcarbonyloxy, alkenylcarbonyloxy, arylcarbonyloxy, aminocarbonyloxy, alkoxyalkyl, aralkyl, alkylcarbonylamino, alkylsulfonylamino, alkylaminocarbonyl, aralkyloxycarbonyl, alkoxycarbonyl or Alkylaminosulfonyl group, which may or may not have a substituent. Of these, it is preferable that Y be a hydroxyl group, carboxyl group, amine group (particularly one containing a 2,2,6,6-alkyl (1 to 8 carbons) piperidine ring structure as a substituent, or one containing no substituent), alkoxy group (particularly one having 1 to 8 carbons, either having a carboxyl group as a substituent or having no substituent), an alkylcarbonyloxy group (particularly one having 1 to 10 alkyl carbons, either having a 2,2,6,6-alkyl (1 to 8 carbons) piperidine ring structure as a substituent, or having no substituent), an alkenylcarbonyloxy group (particularly one having 1 to 8 alkenyl carbons), an arylcarbonyloxy group (particularly one having a carboxyl group as a substituent), an aminocarbonyloxy group (particularly one having an alkyl group with 1 to 8 carbons as a substituent), an arylsulfonylamino group (particularly one having an alkylsufonylamino group having 1 to 8 carbons as a substituent), or an alkylaminocarbonyl group (particularly with 1 to 8 alkyl carbons).

It is also possible for Y to be a polymer, with that polymer having a polyamine, for example. The compound expressed by the formula (I), moreover, can be a polymer having X and Y as (a) main chain(s), with such a polymer being a polyester, for example.

Preferred specific examples of specific solubility hindered amine compounds such as these are indicated below as compounds 1 to 17. The specific solubility hindered amino compound relating to the present invention is not limited to or by these example compounds.

Compound 1

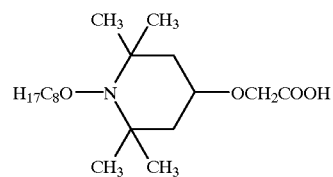

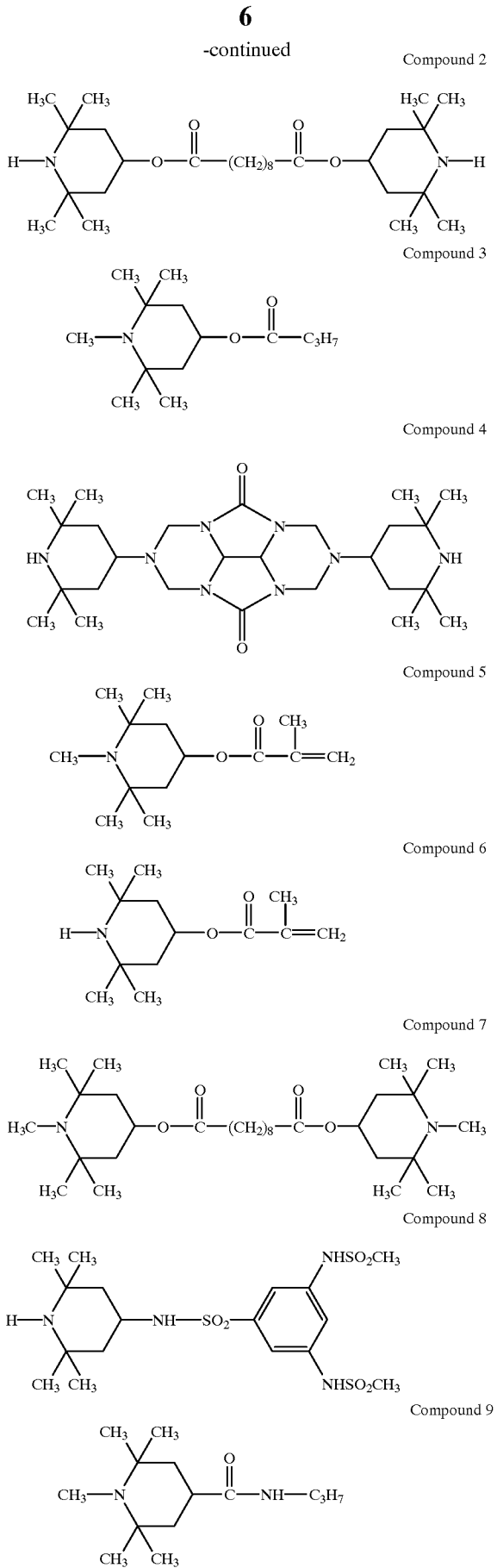

Compound 10

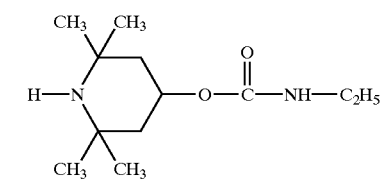

Compound 11

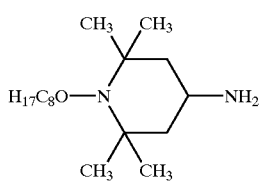

Compound 12

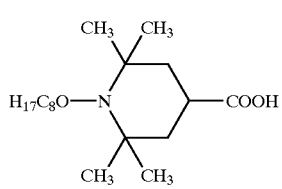

Compound 13

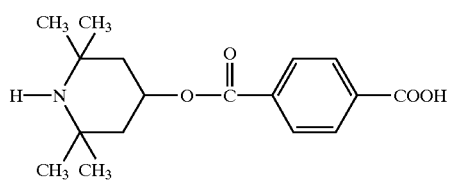

Compound 14

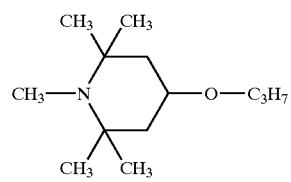

Compound 15

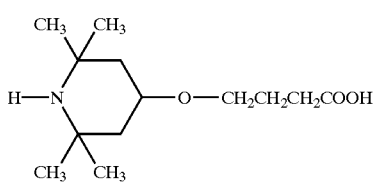

Compound 16

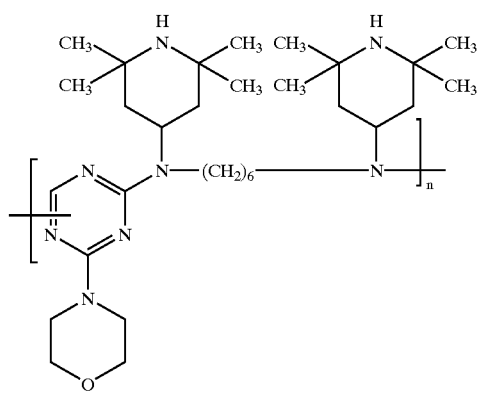

Compound 17

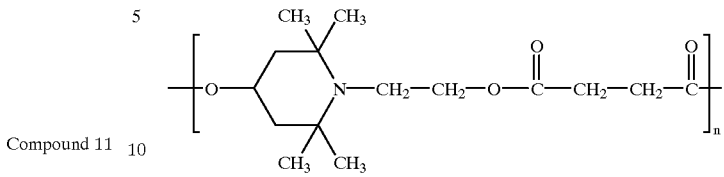

Of these specific solubility hindered amine compounds, it is clear that compounds 1 to 3 exhibit particularly outstanding effectiveness, as will be indicated in the embodiments described further below.

The specific solubility hindered amine compounds can exhibit the effects of the present invention, even when used in small quantities, as stated earlier, but the quantity of hindered amine compound contained should be preferably from 0.1 to 10 parts by weight, and more preferably from 1 to 5 parts by weight, in 100 parts by weight of the ink receiving layer.

It is desirable that a cationic resin be contained, in addition to the specific solubility hindered amine compound described above, in the ink receiving layer in the recording medium of the present invention, in order to be able to enhance image light resistance and water resistance simultaneously.

A cationic resin that can be used in the present invention refers to a monomer, oligomer, or polymer that dissociates and exhibits cationic properties when dissolved in water. For such a cationic resin, a compound having a quaternary ammonium group is preferable, with a compound having the structure expressed by one of the general formulas (A) to (D) and a compound (E) below being particularly preferably.

(A)

(where $R_1$, $R_2$, and $R_3$ respectively and independently represents an alkyl group; m represents an integer from 1 to 7; n represents an integer from 2 to 10; and Y represents an acid group.)

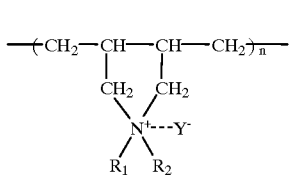
(B)

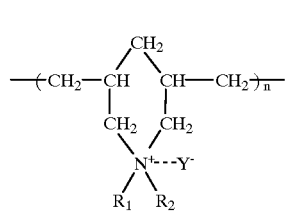
(C)

-continued

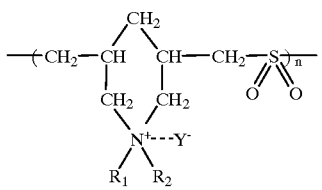

(In formulas (B) to (D), $R_1$ and $R_2$ respectively and independently represent —$CH_3$, —$CH_2CH_3$, or, —$CH_2CH_2OH$ group, and Y represents an acid group.)

Polyalkelynepolyaminedicyandiamide ammonium salt condensate (E).

Here, for the compound expressed by the general formula (A) given above, Narpoly 607 (manufactured by Narco Chemical Co.) and Polyfix 601 (manufactured by Showa Highpolymer Co.) may be used, for example.

The compounds expressed by the general formulas (B) to (D) above are polydiallylamine derivatives, obtained by the cyclization condensation of a diallylamine compound, such as, for example, Barcol 1697 (manufactured by Allied Colloid Co.), Cat Floc (Calgon Corp), PAS (manufactured by Nitto Boseki), and Neofix RPD (manufactured by Nikka Kagaku).

The compound (E) above may be Neofix RP-70 (manufactured by Nikka Kagaku), for example.

The cationic resin content in the ink receiving layer should generally be 0.1 to 4 $g/m^2$, and preferably 0.2 to 2 $g/m^2$.

In the ink receiving layer in the recording medium of the present invention, inorganic pigments can also be used. There is no particular limitation on the types of such inorganic pigments, And all kinds of inorganic pigment can be used. Examples are silica pigments, alumina pigments, titanium dioxide pigments, zinc oxide pigments, zirconium oxide pigments, mica-form iron oxide, white lead, lead oxide pigments, cobalt oxide pigments, strontium chromate, molybdenum pigments, smectite, magnesium oxide pigments, calcium oxide pigments, calcium carbonate pigments, and mullite. These inorganic pigments can be used singly or in combinations of two or more types.

Even among these inorganic pigments, the silica pigments and alumina pigments are preferable. The silica pigment may be either spheroidal silica or amorphous silica, or, alternatively, synthetic silica produced by a dry process, wet process, or aerogel process. The silica pigment may also be hydrophobic silica that has been surface-treated with a trimethyl silyl group or silicone or the like. These are preferably used as colloidal silica. The mean particle diameter of the silica pigment should be from 4 mu to 120 mu, and preferably from 4 mu to 90 mu. The silica pigment may be either porous or non-porous, but porous is preferable, with the silica pigment particles preferably having a mean pore diameter of 50 to 500 nm and a pore volume of 0.5 to 3 cc/g.

The ink receiving layer can also contain an adhesive. Examples of such adhesives that may be used include oxide starches, etherized starches, such cellulose derivatives as carboxymethyl cellulose and hydroxyethyl cellulose, casein, gelatins, soy protein, polyvinylalcohol and derivatives thereof, anhydrous maleic acid resins, conjugated diene polymer latexes such as ordinary styrene-butadiene copolymers and methylmethacrylate-butadiene copolymers, acrylic polymer latexes such as polymers or copolymers of acrylic acid esters and methacrylic acid esters, vinyl polymer latexes such as ethylene-vinyl acetate copolymers, or modified functional group polymer latexes based on monomers containing the carboxyl group or other functional group of these various kinds of polymer, water-soluble adhesives of thermosetting resins such as melamine resins, or ureic resins, and adhesives of other synthetic resins such as poly(methyl methacrylate)s, polyurethane resins, unsaturated polyester resins, vinyl chloride-vinyl acetate copolymers, poly(vinyl butyral)s, alkyl resins, etc., which may be used either singly or in combination. These adhesives, in the interest of preventing a decline in the void structure due to the formation of films thereof, should be used in quantities of from 2 to 100 parts by weight relative to 100 parts by weight of pigment, and preferably from 5 to 30 parts by weight, although the ratio thereof is not particularly limited so long as the quantity used is sufficient to bond the pigment.

In the ink receiving layer, furthermore, as necessary, pigment dispersants, thickeners, fluidity modifying agents, defoaming agents, foam inhibitors, mold releasing agents, penetrating agents, coloring dyes, coloring pigments, fluorescent whitening agents, ultraviolet absorbing agents, antioxidants, preservatives, fungicides, and the like may be mixed in as appropriate.

For the supporting body that configures the recording medium of the present invention, paper or a sheet-form material such as a thermoplastic resin film is used.

When paper is used, the paper should either have no sizing agent added or be moderately sized, and may either contain or not contain a filler.

When a thermoplastic film is used, either a transparent film such as polyester, polystyrene, polyvinyl chloride, polymethyl methacrylate, cellulose acetate, polyethylene, or polycarbonate, or a white non-transparent film either containing a white pigment filler or based on fine foam is used. For the white filler pigment, titanium oxide, calcium sulfate, calcium carbonate, silica, clay, talc, zinc oxide, or the like is used.

Alternatively, so-called laminate paper can be used which is made by applying such resin films to the surface of the paper or by a molten rosin treatment. In order to improve the bonding between the ink receiving layer and the surface of such resins, the paper may have an underlayer or be subjected to a corona discharge treatment.

For the method of forming the ink receiving layer containing the specific solubility hindered amine compound described above, there is the method of applying to the supporting body a coating liquid containing that specific solubility hindered amine compound, and the method of immersing the supporting body in that coating liquid. The specific solubility hindered amine compound may either be directly added as an undiluted solution or in a powdered form into the ink receiving layer coating liquid, or added in the form of an emulsion or dispersion or other aqueous dispersion or solvent solution or the like.

Here, when the ink receiving layer is formed by coating on a coating liquid, a blend coater, air knife coater, roll coater, brush coater, curtain coater, bar coater, gravure coater, or spray apparatus or the like is generally used for the coater. When the supporting body is paper, it is possible to employ a sizing press, gate roll, or spray or the like on the papermaking machine. Sheets made by simply deploying the ink receiving layer on the supporting body may be used just as they are as the recording medium in the present invention, but it is also possible to make the surface of the paper smooth by passing it between nip rolls under heating and/or pressure with a super calender or gross calender or the like.

The ink receiving layer should be formed with a dried coating quantity of 5 to 50 g/m², with 10 to 40 g/m² being particularly desirable.

The recording medium in the present invention is configured as described in the forgoing, but the added value thereof can be further enhanced by imparting gloss to the surface thereof. Such gloss may be imparted by a surface treatment or the like with a calendar or the like on the surface of the ink receiving layer, involving selecting the ink receiving layer formation method (method of providing a layer like a laminate or glossy layer as described below, etc.), or a method wherein a glossy layer exhibiting gloss is laminated on the ink receiving layer. Such a glossy layer would have a gloss of 10 or more based on the 60-degree mirror surface gloss tasting method. There is no particular limitation on the composition of the glossy layer, but the use of the silica and binder resin used in the ink receiving layer is to be preferred.

The method used in forming the glossy layer may be suitably selected, but a method called the film casting method, described below, is preferred. The film casting method that can be used in the present invention may be one wherewith a coating liquid for the glossy layer is coated onto a film, and that film is then superimposed on the ink receiving layer, or one wherewith a coating liquid for the glossy layer is coated onto the ink receiving layer, and then a film is superimposed thereon. When implementing such a film casting method, the method of coating on the glossy layer coating liquid is not particularly limited so long as the coating liquid can be uniformly coated onto the film surface or ink receiving layer surface. Examples of methods that can be used for this coating include air knife coating, rod bar coating, gravure coating, and reverse roll coating.

When implementing the film casting method, the glossy layer coating liquid is coated on the surface of a film of smooth surface (preferably a resin film), and then the film having that coating liquid is applied to the ink receiving layer with the coated surface site facing the ink receiving layer. Alternatively, the glossy layer coating liquid is coated onto the ink receiving layer, and then a film having a smooth surface (preferably a resin film) is superimposed thereon. It is necessary that the film be superimposed before the coating liquid layer has dried, preferably immediately after the coating. The superimposing should be performed by passing the materials between two rolls (nip rolls). The superimposition conditions (such as pressure and temperature, etc.) may be suitably determined within ranges wherewith good gloss in the glossy layer and various other characteristics of the recording medium can be realized, but it is preferable that the nip roll pressure be from 3 to 5 kg/cm² or so. Preferred examples of the superimposed film that can be used include films of resins such as polyester, polypropylene, polyethylene, and polyimide, etc., exhibiting a high degree of smoothness (Deck flatness of 5000 seconds or greater), or resin films produced by subjecting the aforesaid resin films to a peel-away silicone treatment, or ethylene tetrafluoride resin film, etc. It is also desirable to use coating liquids and films that satisfy a relationship such that the angle of contact with the coating liquid is 90 degrees or less.

After superimposing the film, the coating liquid film is dried. Then the film is peeled away to yield the recording medium. The coating liquid layer is dried by evaporating the solvent from the supporting body side.

The mixture ratio between the binder resin and silica in the glossy layer should be such that 5 to 50 parts by weight of binder resin are used per 100 parts by weight of silica, with a range of 5 to 30 parts by weight being particularly desirable. In cases where a glossiness of gloss 20 or greater is particularly demanded, it is preferable to use a silica sol. In order to obtain good glossiness without impairing the function of the ink receiving layer, moreover, the glossy layer should be formed to a thickness of 5 to 12 μm, with 8 to 10 μm being particularly ideal.

The recording liquids suitable for use with the recording medium of the present invention are not particularly limited, and all kinds of recording liquids can be used, but the use of an ink jet recording liquid (ink) is particularly desirable.

For the colorant used in such a recording liquid, aqueous dyes, oily dyes, or pigment can be used. In general, however, direct dyes, acid dyes, basic dyes, washproof dyes, or reaction dyes are used.

In the present invention, when images are formed using a recording liquid containing a dye comprising a compound expressed by the general formula (II) below, in particular, it is possible to form images of more outstanding light resistance, wherefore such use is to be preferred.

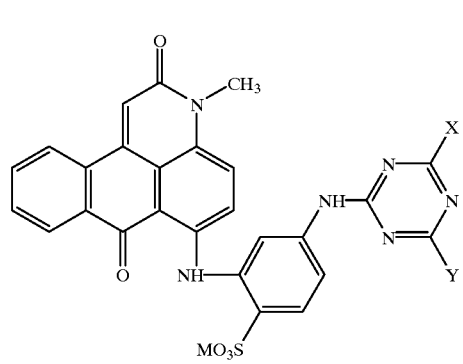

(II)

where x is an anilino group substituded with at least one SO₃M, Y is OH, Cl, or a morpholino group, and M is H, Li, Na, K, ammonium, or an organic amine.

The compound represented by the general formula (II) above is a magenta colorant (magenta dye) used in a magenta ink. Conventionally, moreover, of the recorded matters (particularly ink jet recorded matters) wherein images are formed using a recording liquid in the recording medium, the recorded matters containing a magenta colorant have been said to result in great deterioration in the light resistance of the image. Nevertheless, when an image is formed using a magenta colorant comprising a compound represented by the general formula (II) given above, the light resistance improvement effect is particularly manifested.
Specific examples of compounds represented by the general formula (II) are indicated below in compounds M-1 to M-10, but such compounds are not limited to these examples.
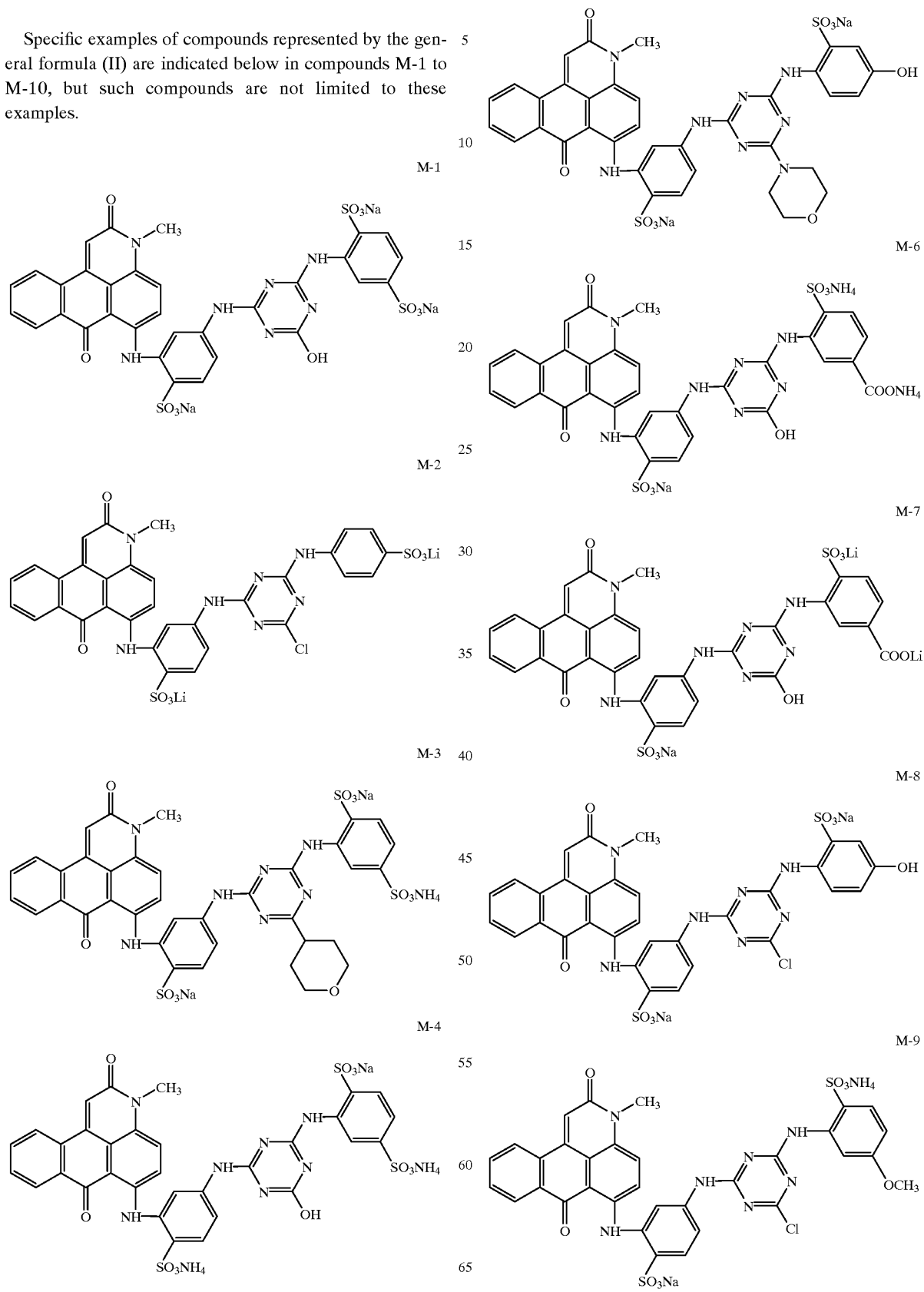

-continued

M-10

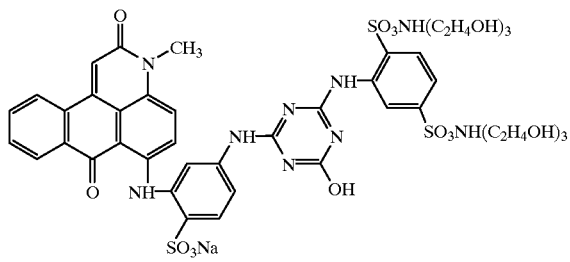

By suitably selecting and combining the compounds represented in the general formula (II) with the hindered amine compound relating to the recording medium of the present invention, the effects of the present invention, that is, ink absorbency and image light resistance, are further enhanced.

The compounds represented in the general formula (II), furthermore, are preferable because, by combining them with the recording medium of the present invention, the effectiveness in enhancing image preserving properties is greater than when other colorants, particularly azo colorants, are used.

The quantity of the compound represented by the general formula (II) above should be 0.1 to 10 parts by weight in 100 parts by weight of the recording liquid, with a range of 0.1 to 4 parts by weight being particularly desirable in the interest of suppressing nozzle clogging in the spray unit due to dye in the recording liquid precipitating out.

In the recording liquid, besides dyes comprising the compounds represented by the general formula (II), other dyes can be used, such, for example, as azo dyes (monoazo dyes, metal complex salt azo dyes, pyrazolone azo dyes, styroben azo dyes, and thiazole azo dyes), anthraquinone dyes, indigoid dyes, phthalocyanine dyes, diphenylmethane dyes, triphenylmethane dyes; xanthene dyes, acridine dyes, azine dines, oxazine dyes, thiazine dyes, cyanine dyes, azomethene dyes, quinoline dyes, nitro dyes, nitroso dyes, benzoquinone dyes, naphthoquinone dyes, naphthalimide dyes, and perinone dyes.

The recording liquid, furthermore, contains a water-soluble organic solvent, and water. The water should not be ordinary water containing various ions, but deionized water. A solvent of low volatility is preferable for the water-soluble organic solvent in the interest of suppressing clogging.

Examples of water-soluble organic solvents include polyhydric alcohols including ethylene glycol, diethylene glycol, triethylene glycol, polyethylene glycols, propylene glycol, 1,3-propanediol, 1,5-pentanediol, 1,2-hexanediol 1,2,6-hexanetriol, and glycerine; glycol ethers including ethylene glycol monomethyl ether, ethylene glycol monobutyl ether, diethylene glycol monomethyl ether, diethylene glycol monobutyl ether, triethylene glycol monomethyl ether, triethylene glycol monobutyl ether, propylene glycol monomethyl ether, propylene glycol monobutyl ether, and dipropylene glycol monomethyl ether; nitrogen-containing solvents including formamide, dimethyl formamide, diethanolamine, triethanolamino, 1,3-dimethyl-2-imidazolidinone, 2-pyrolidone, and N-methyl-2-pyrolidone; and sulfur-containing solvents including thiodiglycol and dimethylsulfoxide, etc., although the water-soluble organic solvent is not limited to these. These water-soluble organic solvents may be used singly or in mixtures of two or more kinds.

The quantity of the water-soluble organic solvent content should be within a range of 3.0 to 40 parts by weight in 100 parts by weight of the recording liquid, a range particularly suitable when an ink jet recording liquid ink is used. If the water-soluble organic solvent content is less than 3.0 parts by weight, clogging at the nozzle tip will readily occur, whereas when 40 parts by weight is exceeded, that is not desirable because then there is a danger of the occurrence of phenomena that impair print quality such as deterioration in the drying characteristics of the recorded image, or image blurring.

Also, by causing the recording liquid to contain an acetylene glycol nonionic surfactant and a glycol ether or the like, the occurrence of blurring can be prevented, print quality improved, and vivid unblurred images obtained. Even better, by using both an acetylene glycol nonionic surfactant and a glycol ether together, color images of even more outstanding print quality and vividness can be obtained.

The acetylene glycol nonionic surfactant may, for example, be Olfin E1010, Olfin STG, or Surfinol 104E (all made by Nissin Kagaku). The quality thereof added should be within a range of 0.01 to 3.0 parts by weight in 100 parts of weight of the recording liquid. When the quantity added is less than 0.01 parts by weight, adequate drying properties are not obtained, whereas when 3 parts by weight is exceeded, that is not desirable because there is then a danger of blurring occurring in the images, leading to a decline in image quality.

For the glycol ether, any of the water-soluble organic solvents noted above are suitable, but diethylene glycol monobutyl ether, triethylene glycol monobutyl ether, propylene glycol monobutyl ether, and dipropylene glycol monobutyl ether are particularly well suited. The quantity thereof added is the same as stated above for the water-soluble organic solvent, but it is even more preferable that the quantity be selected from a range of 3.0 to 30 parts by weight in 100 parts by weight of the recording liquid. When the quantity added is less than 3.0 parts by weight, almost no benefit is realized, whereas when 30 parts by weight is exceeded, blurring becomes greater, the overall image becomes blurry, and print quality is worsened rather than improved, wherefore the range stated above should be used.

The water content at this time is determined with a wide range dependent on the type of solvent constituents, as noted above, the composition thereof, and the recording liquid properties desired, but that range is generally determined so as to make up 10 to 70 parts by weight in 100 parts by weight of the recording liquid.

Besides the constituents noted in the foregoing, a viscosity adjusting agent such as sodium alginate or a polyvinyl alcohol or the like, a hydroxide of an alkali metal such as potassium hydroxide, sodium hydroxide, or lithium hydroxide, a pH adjusting agent such as ammonium phosphate or other pH buffering agent, preservatives, anticorrosives, antioxidants, mildew-proofing agents, or chelating agents or the like may be added into the recording liquid to impart desired functions thereto as necessary.

Based on the present invention, an image forming method is provided wherewith images are formed on the recording medium described in the foregoing using a recording liquid containing a compound expressed by the general formula (II) given earlier.

This image forming method is a method for forming images using a recording liquid containing a compound expressed by the general formula (II), but the method is particularly well suited for use in ink jet recording, in which case, the head discharge scheme employed can be any conventionally known scheme. In particular, with a method wherewith liquid droplets are discharged using the vibrations of a piezoelectric element, or a method that utilizes thermal energy, it is possible to implement an outstanding ink jet recording method.

Based on the present invention, moreover, recorded matters are provided wherein images are formed on the recording medium described earlier using a recording liquid containing a compound expressed by the general formula (II) given earlier. These are recorded matters wherein images of outstanding light resistance are formed.

Embodiments

The recording medium, image recording method, and recorded matter of the present invention are now described in even greater detail with embodiments and comparative examples. The present invention is not in any way limited to or by these embodiments, however.

Supporting Body Fabrication

Raw material pulp comprising 50 wt. % of NBKP and 50 wt. % of LBKP was prepared to a degree of beating of 30° SR using a beater, and raw material was obtained wherein the chemical additives were added in the proportions noted below relative to the pulp. This was made into paper using a wire paper machine. This was then coated, to a coating quantity of 1.0 g/m², with a coating liquid comprising the coating chemicals noted below, in a sizing press. This was than dried to yield a paper base material for the supporting body.

(1) Additive Chemicals

| | |
|---|---|
| Clay (special class clay made by Kanaya Kogyo) | 2.25 wt. % |
| Talc (SWB, made by Nihon Talc Co.) | 2.25 wt. % |
| Melamine resin (Sumirez Resin 607SY, made by Sumitomo Chemical Co., Ltd.) | 0.23 wt. % |
| Rosin sizing (Sizepine E, made by Arakawa Chemical Industries) | 0.5 wt. % |
| Aluminum Sulfate (made by Nippon Light Metal) | 2.7 wt. % |

(2) Coating Chemicals

| | |
|---|---|
| Oxide starch (SK-20, made by Japan Cornstarch Co.) | 20 pts/wt |
| Polyacrylamide (Polyacet 305, made by Arakawa Kagaku) | 40 pts/wt |
| Common salt | 0.5 pts/wt |
| Water | 500 pts/wt |

Fabrication of Recording Medium (1) Fabrication of Ink Receiving Layer

The ink receiving layer coating liquid having the composition indicated below was coated with air knife coaters onto the surface of the supporting body obtained by the method described in the foregoing, to obtain a dried coating quantity of 20 g/m², and drying was then implemented to provide the ink receiving layer.

| (Composition of ink receiving layer coating liquid) | |
|---|---|
| Silica (Product name "Fine Seal X37B," made by K.K. Tokuyama) | 100 pts/wt |
| Polybinyl alcohol (Product name "Gorsenar T-330," 10% aqueous solution, made by Nippon Synthetic Chemical Industry Co., Ltd.) | 400 pts/wt |
| Cationic polymer (Product name "Neofix RP-70," made by Nikka Kagaku) | 25 pts/wt |
| Hindered amine compound (noted in Table 1) | 5 pts/wt |
| Water | 600 pts/wt |

Next, ink composition liquids containing the magenta colorants noted in Table 1 were mixed and dissolved in the mixing proportions indicated below, and filtered under pressure in a membrane filter of 1 μm pore diameter, to prepare ink composition liquids. The compositions indicated below indicate the types and quantities (parts by weight) of the constituents in the ink composition liquid. M-1 to M-3 in Table 1 are magenta colorants expressed by the general formula (II) indicated earlier as an example, while the compounds a to c are magenta colorants other than those expressed by the general formula (II), which have the structures diagramed below.

Compound a

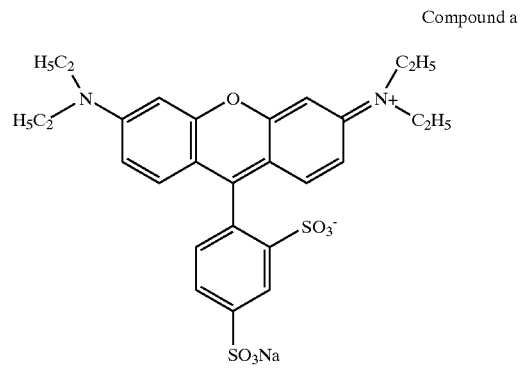

Compound b

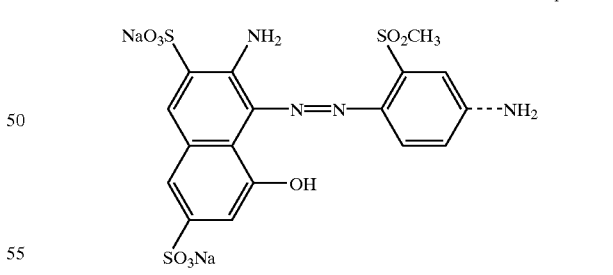

Compound c

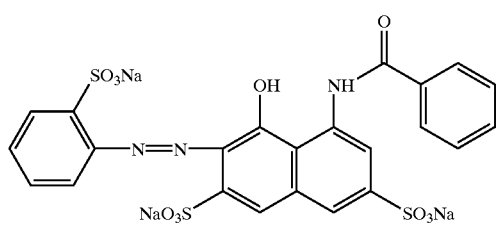

(Ink Composition Liquid)

| | |
|---|---|
| Magenta colorant (noted in Table 1) | 2.0 pts/wt |
| Triethylene glycol monobutyl ether | 10 pts/wt |
| Diethylene glycol | 10 pts/wt |
| Glycerin | 10 pts/wt |
| Triethanolamine | 1.0 pts/wt |
| Ethylene diamine bisodium tetra-acetate | 0.01 pts/wt |
| (acetylene glycol surfactant made by Nissin Kagaku) Purokiseru XL-2 | 0.3 pts/wt |
| (preservative, made by Senega (KK)) Ion exchange water | 65 pts/wt |

The ink composition liquids having the composition noted above were loaded into the ink chambers of ink cartridges for a commercially available ink jet printer (PM-800C, made by Seiko Epson Corporation). Using this printer, images were recorded on the various recording media (containing a hindered amine noted in Table 1 in the ink receiving layer) obtained as described in the foregoing, yielding magenta image samples (recorded matters). Using these samples, light resistance and ink absorbency were evaluated in accordance with the evaluation methods described below. The results are noted in Table 1.

Light resistance evaluation: Using the Xenon Weather-ometer Ci35A (made by Atlas Electronic Device Co.), the samples were irradiated with light for 50 hours. The ratio of residual concentration in these samples relative to samples not irradiated were measured. A Gretag concentration motor (made by Gretag Macbeth Co.) was used in measuring the concentrations.

(Light resistance (%)=(magenta light reflection concentration of irradiated sample/magenta light reflection concentration of non-irradiated sample)×100)

Ink absorbency evaluation; Solid magenta printing was performed with the printer noted earlier, and visual evaluations were made according to the evaluation standards noted below.
◯: Good; no running even when ink applied in large amount
×: Running and bleeding occur when ink applied in large amount

TABLE 1

| | HINDERED AMIDE COMPOUND | MAGENTA COLORANT | LIGHT RESIST-ANCE (%) | INK ABSORB-ENCY |
|---|---|---|---|---|
| EMBODIMENT 1 | COMPOUND 1 | M-1 | 83 | ◯ |
| EMBODIMENT 2 | COMPOUND 1 | M-2 | 82 | ◯ |
| EMBODIMENT 3 | COMPOUND 1 | M-3 | 84 | ◯ |
| EMBODIMENT 4 | COMPOUND 1 | COMPOUND a | 75 | ◯ |
| EMBODIMENT 5 | COMPOUND 1 | COMPOUND b | 76 | ◯ |
| EMBODIMENT 6 | COMPOUND 1 | COMPOUND c | 77 | ◯ |
| EMBODIMENT 7 | COMPOUND 2 | M-1 | 86 | ◯ |
| EMBODIMENT 8 | COMPOUND 2 | M-2 | 85 | ◯ |
| EMBODIMENT 9 | COMPOUND 2 | M-3 | 86 | ◯ |
| EMBODIMENT 10 | COMPOUND 2 | COMPOUND a | 80 | ◯ |
| EMBODIMENT 11 | COMPOUND 2 | COMPOUND b | 79 | ◯ |
| EMBODIMENT 12 | COMPOUND 2 | COMPOUND c | 78 | ◯ |
| EMBODIMENT 13 | COMPOUND 3 | M-1 | 84 | ◯ |
| EMBODIMENT 14 | COMPOUND 3 | M-2 | 84 | ◯ |
| EMBODIMENT 15 | COMPOUND 3 | M-3 | 83 | ◯ |
| EMBODIMENT 16 | COMPOUND 3 | COMPOUND a | 76 | ◯ |
| EMBODIMENT 17 | COMPOUND 3 | COMPOUND b | 77 | ◯ |
| EMBODIMENT 18 | COMPOUND 3 | COMPOUND c | 76 | ◯ |
| COMP. EXAMPLE 1 | COMPOUND 18 | M-1 | 77 | × |
| COMP. EXAMPLE 2 | COMPOUND 18 | M-2 | 75 | × |
| COMP. EXAMPLE 3 | COMPOUND 18 | M-3 | 75 | × |
| COMP. EXAMPLE 4 | COMPOUND 18 | COMPOUND a | 69 | × |
| COMP. EXAMPLE 5 | COMPOUND 18 | COMPOUND b | 69 | × |
| COMP. EXAMPLE 6 | COMPOUND 18 | COMPOUND c | 70 | × |
| COMP. EXAMPLE 7 | COMPOUND 19 | M-1 | 69 | ◯ |
| COMP. EXAMPLE 8 | COMPOUND 19 | M-2 | 71 | ◯ |
| COMP. EXAMPLE 9 | COMPOUND 19 | M-3 | 71 | ◯ |
| COMP. EXAMPLE 10 | COMPOUND 19 | COMPOUND a | 62 | ◯ |
| COMP. EXAMPLE 11 | COMPOUND 19 | COMPOUND b | 62 | ◯ |
| COMP. EXAMPLE 12 | COMPOUND 19 | COMPOUND c | 63 | ◯ |
| COMP. EXAMPLE 13 | NONE | M-1 | 49 | ◯ |
| COMP. EXAMPLE 14 | NONE | M-2 | 50 | ◯ |
| COMP. EXAMPLE 15 | NONE | M-3 | 51 | ◯ |
| COMP. EXAMPLE 16 | NONE | COMPOUND a | 50 | ◯ |
| COMP. EXAMPLE 17 | NONE | COMPOUND b | 49 | ◯ |
| COMP. EXAMPLE 18 | NONE | COMPOUND c | 50 | ◯ | compounds 1 to 3 in Table 1, which are hindered amine compounds, are compounds having the structure(s) indicated as examples in the foregoing. Compounds 1 to 3, here, are all compounds having a solubility within a range of 0.01 to 5%. Compounds 18 and 19 in Table 1, which are also hindered amine compounds, are compounds having the structures indicated below. Here, compound 18 is "Tinuvin 622LD, manufactured by Ciba-Geigy (Japan) Ltd. (having a solubility of less than 0.01% and a molecular weight of from 3,100 to 4,000). Compound 19 is a compound having a solubility that exceeds 5%.

Compound 18

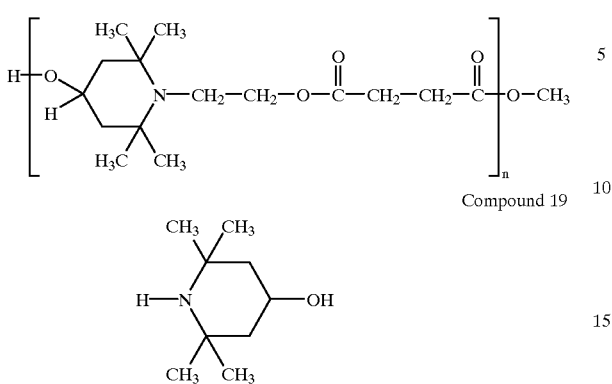

Compound 19

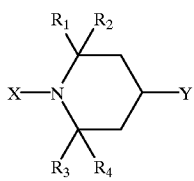

As is evident from the results given in Table 1, recording media (embodiments) provided with an ink receiving layer containing a hindered amine compound having a specific solubility in water exhibit both outstanding image light resistance and outstanding ink absorbency as compared to the recording media in the comparative examples. It is particularly evident that the light resistance is even more outstanding when an ink composition liquid containing a magenta colorant expressed by the general formula (II), given earlier, is used.

The recording medium of the present invention excels both in ink absorbency and image light resistance.

Based on the image forming method of the present invention, ink can be easily absorbed, and images can be formed which exhibit outstanding light resistance.

The recorded matter of the present invention has formed therein an image that exhibits outstanding light resistance.

What to claimed is:

1. An image forming method for forming images on a recording medium comprising the steps of:

(a) providing a recording medium comprising a supporting body; and an ink receiving layer on said supporting body, wherein said recording medium contains in said ink receiving layer a compound expressed by general formula (I) indicated below and exhibiting a solubility in water of 0.01 to 5%, (I)

wherein X represents a hydrogen atom, or an alkyl, aryl, alkenyl, acyl, sulfonyl, sulfinyl, alkoxy, or acyloxy group, which may or may not have a substituent; $R_1$ to $R_4$ respectively and independently represents a hydrogen atom or an alkyl group; and Y represents a hydroxyl, carboxyl, alkyl, amino, alkenyl, alkoxy, aryl, alkylcaronyloxy, alkenylcarbonyloxy, arylcarbonyloxy, aminocarbonyloxy, alkoxyalkyl, aralkyl, alkylcarbonylamino, alkylsulfonylamino, alkylaminocarbonyl, aralkyloxycarbonyl, alkoxycarbonyl, or alkylaminosulfonyl group, which may or may not have a substituent, wherein Y can be a polymer, and the compound expressed by formula (I) can be a polymer having X and Y as main chains;

(b) depositing on the recording medium a recording liquid comprising a compound represented by general formula (II) given below, (II)

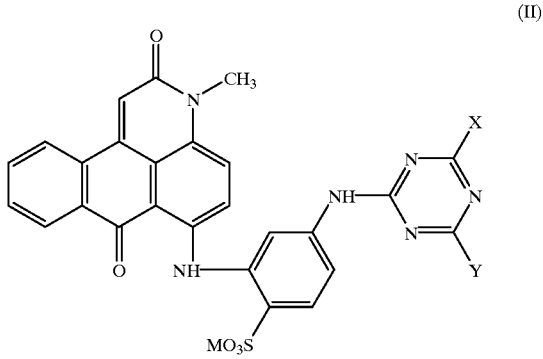

wherein X is an anilino group substituded with at least one $SO_3M$, Y is OH, Cl, or a morpholino group, and M is H, Li, Na, K, ammonium, or an organic amine.

2. A record formed by the method of claim 1.

3. The method according to claim 1, wherein the compound of the general formula I is present in the ink receiving layer in an amount of from 1 to 5 parts by weight in 100 parts by weight of the ink receiving layer.

4. The method according to claim 1, wherein the ink receiving layer further comprises a cationic resin.

5. The method according to claim 4, wherein the cationic resin is present in the ink receiving layer in an amount of 0.1 to 4 g/m².

6. The method according to claim 3, wherein the hindered amine compound is selected from the group consisting of Compound 1

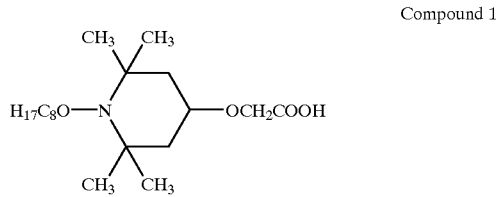

Compound 2

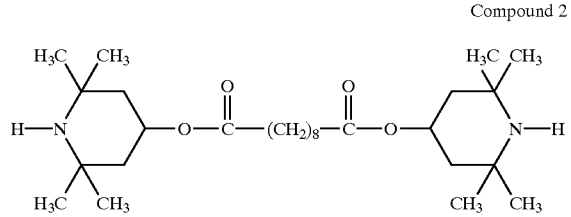

Compound 3

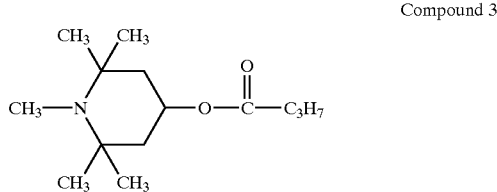

Compound 4
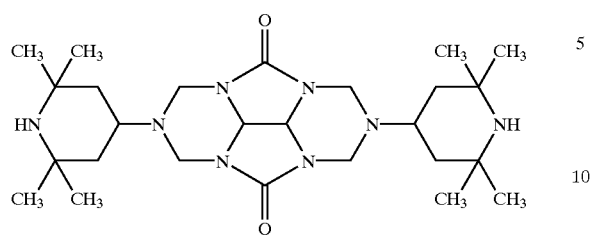
Compound 5
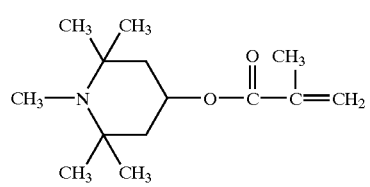
Compound 6
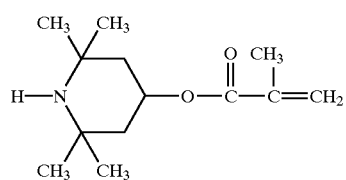
Compound 7
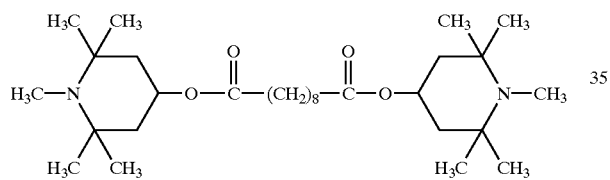
Compound 8
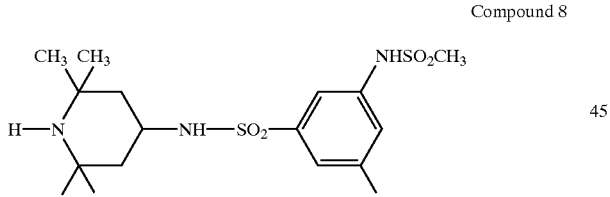
Compound 9
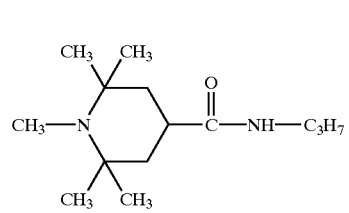
Compound 10
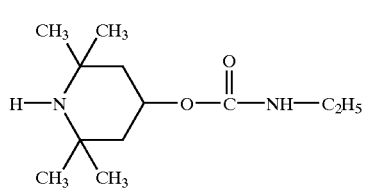
Compound 11
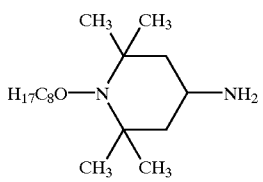
Compound 12
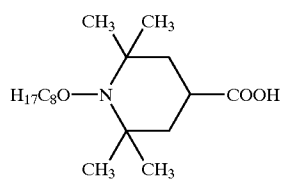
Compound 13
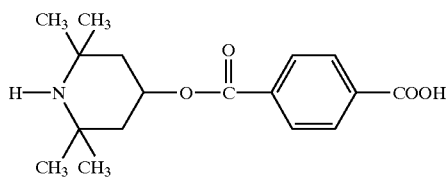
Compound 14
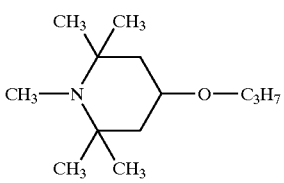
Compound 15
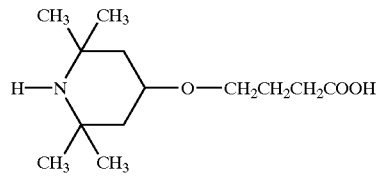
Compound 16
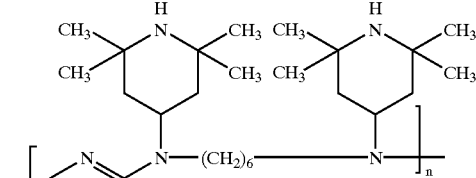
Compound 17
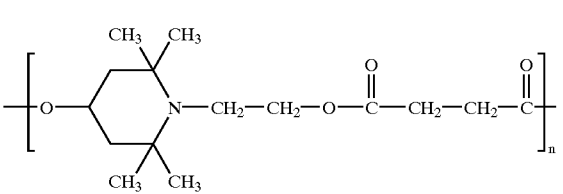

7. The method according to claim 6, wherein the compound of general formula II selected from the group consisting of
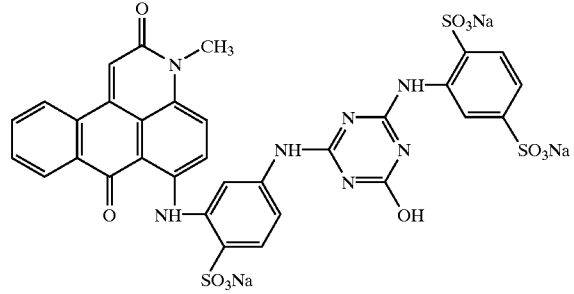
M-1
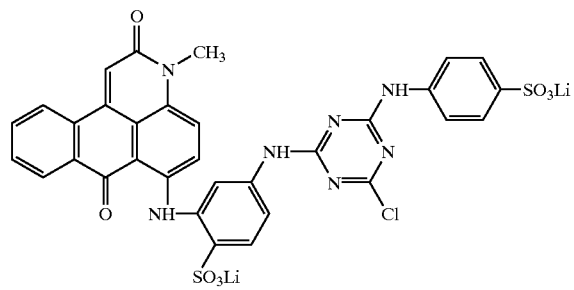
M-2
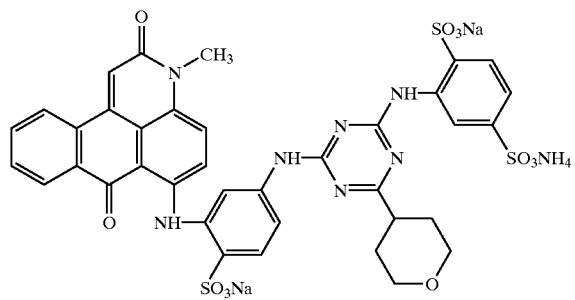
M-3
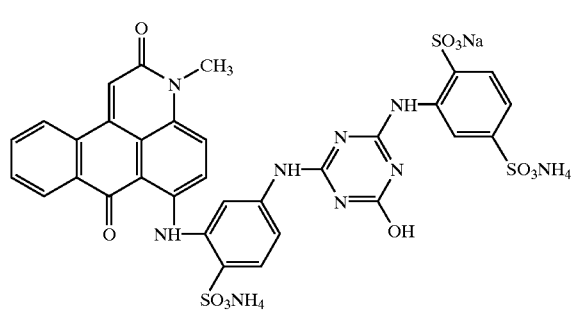
M-4
-continued
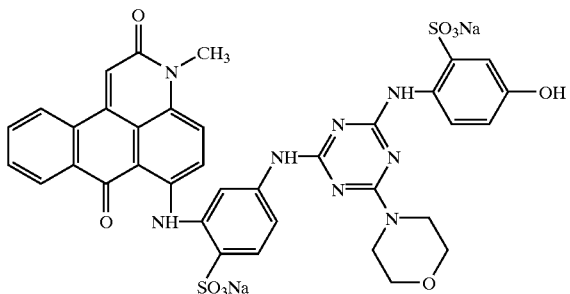
M-5
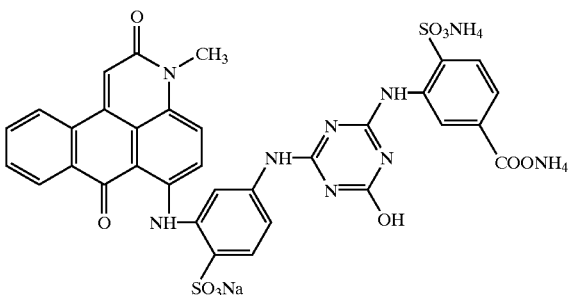
M-6
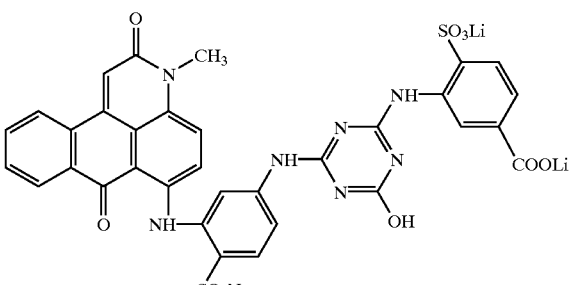
M-7
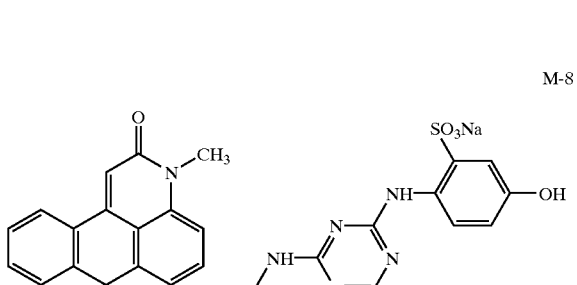
M-8
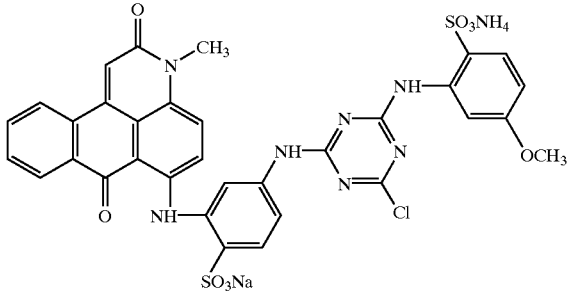
M-9

-continued
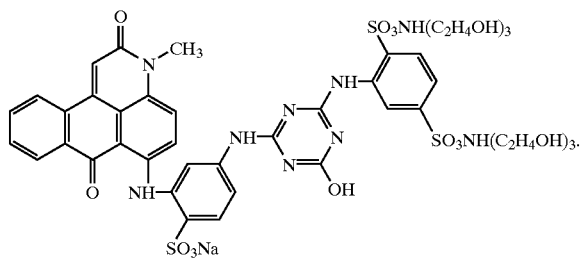
M-10
8. The method according to claim 6, wherein the compound of the general formula I is compound 1.
9. The method according to claim 6, wherein the compound of the general formula I is compound 2.
10. The method according to claim 6, wherein the compound of the general formula I is compound 3.
* * * * *